United States Patent [19]

Meixner et al.

[11] Patent Number: 5,068,305
[45] Date of Patent: Nov. 26, 1991

[54] POWDER COATING COMPOSITIONS CONTAINING POLYURETHANES HAVING (METH)ACRYLOYL GROUPS AS BINDERS

[75] Inventors: Jürgen Meixner, Krefeld; Josef Pedain, Cologne; Peter Höhlein, Kempen; Hans-Joachim Kreuder, Krefeld, all of Fed. Rep. of Germany

[73] Assignee: Bayer Aktiengesellschaft, Leverkusen, Fed. Rep. of Germany

[21] Appl. No.: 556,223

[22] Filed: Jul. 20, 1990

[30] Foreign Application Priority Data

Jul. 26, 1989 [DE] Fed. Rep. of Germany ....... 3924679

[51] Int. Cl.[5] ............................................ C08G 18/30
[52] U.S. Cl. ..................................................... 528/49
[58] Field of Search ........................................... 528/49

[56] References Cited

U.S. PATENT DOCUMENTS 4,133,723 1/1979 Howard et al. ...................... 528/49
4,225,650 9/1980 van Brederode et al. .......... 428/405
4,839,438 6/1989 Evers et al. ......................... 525/440

FOREIGN PATENT DOCUMENTS 1226987 9/1987 Canada .

*Primary Examiner*—Maurice J. Welsh
*Attorney, Agent, or Firm*—Joseph C. Gil; Thomas W. Roy

[57] ABSTRACT

The present invention relates to powder coating compositions which can be cured in the presence of heat and/or high energy radiation and contain polyurethanes which melt at temperatures of 50° to 180° C., have 3 to 10% by weight of olefinic double bonds in the form of (meth)acryloyl groups (calculated as $=C=C=$, molecular weight$=24$) and are based on the reaction product of A) 40 to 80 parts by weight of one or more organic polyisocyanates with
B) 15 to 50 parts of weight of one or more monohydric alcohols containing (meth)acryloyl groups and
C) 2 to 20 parts by weight one or more compounds which are free from (meth)acryloyl groups and contain isocyanate reactive groups.

3 Claims, No Drawings

POWDER COATING COMPOSITIONS CONTAINING POLYURETHANES HAVING (METH)ACRYLOYL GROUPS AS BINDERS

BACKGROUND OF THE INVENTION

1. Field of the Invention

This invention relates to powder coating compositions which may be cured by heat and/or high energy radiation and contain polyurethanes having (meth)acryloyl groups as binders.

2. Description of the Prior Art

Pulverulent coating compositions are known and are generally two-component coating compositions based on polyhydroxyl compounds or polycarboxyl compounds and suitable reactive polyfunctional compounds (crosslinking agents).

Crystalline, unsaturated polyester resins which can be cross-linked by means of peroxides at high temperatures have also been described (e.g. EP-A 98 655 and EP-A 188 846). These unsaturated polyester resins mixed with peroxide are not stable in storage, nor are the peroxide-containing pulverulent mixtures containing unsaturated acrylate groups described in DE-OS 2 647 700.

It is an object of the present invention to provide new powder coating binders which may be cross-linked without the addition of cross-linking components or peroxides such that they are highly stable in storage. It is an additional object of the present invention to provide powder coating binders which result in coatings which have excellent properties, in particular, hardness, solvent resistance and scratch resistance.

These objects may be achieved in accordance with the present invention by using certain selected polyurethanes having acryloyl groups as described below.

SUMMARY OF THE INVENTION

The present invention relates to powder coating compositions which can be cured in the presence of heat and/or high energy radiation and contain polyurethanes which melt at temperatures of 50° to 180° C., have 3 to 10% by weight of olefinic double bonds in the form of (meth)acryloyl groups (calculated as $=C=C=$, molecular weight $=24$) and are based on the reaction product of A) 40 to 80 parts by weight of one or more organic polyisocyanates with B) 15 to 50 parts by weight of one or more monohydric alcohols containing (meth)acryloyl groups and C) 2 to 20 parts by weight of one or more compounds which are free from (meth)acryloyl groups and contain isocyanate reactive groups.

DETAILED DESCRIPTION OF THE INVENTION

The polyurethanes to be used according to the invention melt within the temperature range of 50°–180° C. The polyurethanes contain the above-mentioned olefinic double bonds in the form of (meth)acryloyl groups. Through this specification the term "(meth)" is understood to mean the presence or absence of the methyl group. For example, "(meth)acryloyl" means either acryloyl or methacryloyl.

The polyurethanes to be used according to the invention are prepared by the reaction of starting components A)–C), the nature and quantitative proportions of these components are preferably chosen to result in polyurethanes which are virtually free from isocyanate groups and have a number average molecular weight ($M_n$) of 800 to 10,000.

Component A) is based on at least one organic polyisocyanate. The polyisocyanates include those known from polyurethane chemistry and containing aliphatically, cycloaliphatically and/or aromatically bound isocyanate groups. The polyisocyanates preferably have a molecular weight of 168 to 1000, more preferably 168 to 300. Suitable polyisocyanates include 1-isocyanato-3,3,5-trimethyl-5-isocyanatomethylcyclohexane (isophorone diisocyanate or IPDI); 4,4'-diisocyanatodicyclohexylmethane; 4,4'-diisocyanatodiphenylmethane and mixtures thereof with 2,4'-diisocyanatodiphenylmethane and optionally the higher functional polyisocyanates of the diphenyl methane series; and 2,4-diisocyanatotoluene and mixtures thereof with 2,6-diisocyanatotoluene.

Modified polyisocyanates based on these monomeric polyisocyanates and containing biuret, isocyanurate or urethane groups are also suitable. These derivatives generally have a molecular weight of up to about 1000. Their preparation is described, for example, in U.S. Pat. No. 3 124 605, U.S. Pat. No. 3 183 112, U.S. Pat. No. 3 919 218 and U.S. Pat No. 4 324 879.

Polyisocyanates preferably used as component A) include 2,4-diisocyanatotoluene and mixtures thereof with up to 35% by weight, based on the mixture, of 2,6-diisocyanatotoluene; and IPDI and/or isocyanurate-containing polyisocyanates obtained by the trimerization of IPDI.

Component B) is based on at least one monohydric alcohol containing (meth)acryloyl groups. Preferred examples of these alcohols are hydroxyalkylesters of acrylic or methacrylic acid preferably having 2 to 4 carbon atoms in the hydroxyalkyl group such as hydroxyethyl(meth)acrylate, 2- and 3-hydroxy-propyl(meth)acrylate and 2-, 3- and 4-hydroxybutyl-(meth)acrylate.

Component C) is based on at least one organic compound which is free from (meth)acryloyl groups and contains at least two, preferably 2 to 4 and more preferably 2 or 3 isocyanate reactive groups, preferably alcoholic hydroxyl groups. Compounds which are particularly suitable for use as component C) or as part of component C) have a molecular weight of 62 to 200. Examples of these compounds include ethylene glycol, 1,2- and 1,3-propanediol, neopentyl glycol, glycerol, trimethylolpropane and pentaerythritol. Compounds having molecular weights above 200 and containing isocyanate reactive groups, preferably hydroxyl groups, such as the polyhydroxy polyethers or polyhydroxy polyesters known from polyurethane chemistry, may also be used as component C) or part of component C) but are less preferred. These less preferred components may sometimes be used but only in minor quantities because otherwise the important condition of the invention concerning the melting range of the polyurethanes cannot be fulfilled.

Preparation of the polyurethanes by reacting the above mentioned starting components may be carried out in inert solvents such as acetone, ethyl acetate, butyl acetate or toluene, preferably at reaction temperatures of 20° to 100° C., in particular 20° to 80° C. The reaction is preferably carried out by reacting components A) and B) together in a first reaction step and then reacting the resulting reaction product with component C).

In practice, for example, the polyisocyanate may be introduced into the reaction vessel and then reacted with the unsaturated monohydric alcohol B) under mild conditions, e.g. within the temperature ranges indicated above. Subsequently the reaction with component C) is carried out, also within these temperature ranges, until the isocyanate content has decreased to below 0.1% by weight.

The addition reaction to produce the polyurethane may be accelerated in known manner by the use of suitable catalysts such as tin octoate, dibutyl tin dilaurate or tertiary amines such as dimethylbenzylamine. The polyurethane or urethane acrylate obtained as the reaction product may be protected against premature, unwanted polymerization by the addition of suitable inhibitors and antioxidants such as phenols and/or hydroquinones in quantities of 0.001 to 0.3% by weight, based on the polyurethane. These auxiliary agents may be added before, during and/or after the reaction which results in the polyurethane.

Any solvent used is removed after the reaction, e.g., by heating the reaction solution to 60° to 100° C. under a vacuum. The polyurethanes should not contain more than 1 to 2% of residual solvent.

The polyurethanes or urethane acrylates obtained as described above are valuable binders for powder coating compositions, which may be worked up into heat cross-linkable clear powder varnishes without any further additives (in which case the binder is the only component of the coating composition). However, the compositions are preferably first mixed with the known auxiliary agents and additives used in coatings technology, e.g., pigments such as titanium dioxide, levelling agents such as polybutylacrylate or silicones or optionally other additives and homogenized at temperatures of about 80° to 140° C., preferably 100° to 120° C., e.g., in extruders or kneaders. The solid product obtained is milled in known manner and screened to remove coarse particles, preferably at least those greater than 0.1 mm.

The pulverulent coating compositions thus prepared may be applied to the parts such as molded parts to be coated by conventional powder application processes such as electrostatic powder spraying or whirl sintering. The coatings may be cured either by heating to temperatures of 130° to 220° C., preferably 150° to 190° C., or by the action of high energy radiation such as UV radiation or electron radiation.

When cross-linking is brought about by UV irradiation, photoinitiators must be added to the coating compositions before they are homogenized. Known compounds used for photo initiation may be used, provided they can be pulverized. Examples of such compounds include 1-hydroxycyclohexyl phenyl ketone, benzyl dimethylketal or, in the case of pigmented systems, 2-methyl-1-(4-(methylthio)-phenyl-2-morpholino-propane-1 or trimethyl-benzoyl-diphenyl-phosphine oxide.

The photoinitiators are added in quantities of 0.1 to 10% by weight, preferably 0.1 to 5% by weight, based on the weight of the polyurethanes. The photoinitiators may be used individually or as mixtures; mixtures frequently provide synergistic effects.

All parts and percentages provided in the following examples are percentages by weight unless otherwise indicated.

EXAMPLES

The polyisocyanates A) set forth in Table 1 were dissolved in ethyl acetate together with 0.1% of 2,5-di-t.-butyl-p-cresol and 0.2% of tin dioctoate.

The ethyl acetate was used in the quantity required to provide a solids content of 60%, based on the total initial weight of the components. The monohydric alcohols B) set forth in Table 1 were then added dropwise at a rate such that the temperature did not rise above 70° C. Component C) was then added and the mixture was maintained at 60° C. until the isocyanate content dropped to less than 0.1% by weight. The solvent was then drawn off under vacuum, (about 15 mbar) at 70°–80° C. until a solids content of about 99% was obtained.

TABLE 1

|   | Original weight (%) | 1 | 2 | 3 | 4 | 5 | 6 |
|---|---|---|---|---|---|---|---|
| A | Isophorone diisocyanate | 60.05 | | | 59.47 | 57.91 | 59.68 |
|   | Tolylene diisocyanate[1] | | 52.06 | | | | |
|   | Trimerized isophorone diisocyanate[2] | | | 79.70 | | | |
| B | Hydroxyethylacrylate | 25.15 | 34.70 | 16.89 | | | 31.18 |
|   | Hydroxyethylmethacrylate | | | | 24.38 | | |
|   | 4-Hydroxybutylacrylate | | | | | 27.05 | |
| C | Trimethylolpropane | 14.80 | 13.24 | 3.41 | 16.15 | 15.04 | |
|   | Pentaerythritol | | | | | | 9.14 |
|   | Onset of softening of the end product (°C.) | 120 | 95 | 125 | 130 | 90 | 85 |
|   | Double bond content (M. wt. = 24), % | 5.21 | 7.18 | 3.06 | 4.50 | 4.51 | 6.45 |

[1] 2,4-Isomer
[2] NCO content: 11.5% (70% in Solvesso 100, an organic solvent available from Exxon)

The products of Examples 1 to 6 were ground to a powder having an average particle size of 50 μm. The coarse particles measuring above 90 μm were screened off and the powder was applied by spraying with a powder spray gun to degreased, double pickled, earthed iron plates (165×65×0.8 mm) at a negative voltage of 90 kV to form a film which had an average thickness of 70 μm after stoving.

a) Thermal curing

The coated plates were heated to 180° C. for 30 minutes. At the end of this treatment, the surfaces of the coated plates were hard, scratch resistant and resistant to water and solvents.

b) Photochemical curing 100 g portions of the powdered polyurethanes from Examples 1 to 6 were mixed with 5 g of photoinitiator (1-hydroxycyclohexylphenyl ketone). After application by electrostatic spraying, the compositions were tempered at 140° C. until they melted. The plates were then moved under a Hanovia radiator (80 W/cm, distance 10 cm) at a speed of 5 m/min. The coatings obtained were hard, scratch resistant and resistant to water and solvents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition which may be cured in the presence of heat and/or high energy radiation and comprises a polyurethane which melts at a temperature of 50° to 180° C., contains 3 to 10% by weight of olefinic double bonds in the form of (meth)acryloyl groups (calculated as =C=C=, molecular weight =24) and comprises the reaction product of A) 40–80 parts by weight of one or more organic polyisocyanates with
B) 15–50 parts by weight of one or more monohydric alcohols containing (meth)acryloyl groups and
C) 2–20 parts by weight of one or more compounds which are free from (meth)acryloyl groups and have molecular weights of from 62–200 and contain at least two isocyanate reactive groups.

2. The powder coating composition of claim 1 wherein said monohydric alcohol comprises a hydroxyalkyl ester of acrylic or methacrylic acid having 2 to 4 carbons in the hydroxyalkyl group.

3. The powder coating composition of claim 1 further containing one or more compounds which are free from (meth)acryloyl groups and have molecular weights of over 200 and contain at least two isocyanate reactive groups.

* * * * *